(12) United States Patent
Caron et al.

(10) Patent No.: US 7,981,394 B2
(45) Date of Patent: Jul. 19, 2011

(54) METHOD FOR TREATING TUNGSTEN CARBIDE PARTICLES

(75) Inventors: Paul Caron, Sainte-Foy (CA); Alain Tremblay, Loretteville (CA)

(73) Assignee: Nanogestion Inc., Brossard (Quebec) (CA)

( * ) Notice: Subject to any disclaimer, the term of this patent is extended or adjusted under 35 U.S.C. 154(b) by 684 days.

(21) Appl. No.: 10/550,701

(22) PCT Filed: Mar. 15, 2004

(86) PCT No.: PCT/CA2004/000391
§ 371 (c)(1),
(2), (4) Date: Dec. 16, 2005

(87) PCT Pub. No.: WO2004/085690
PCT Pub. Date: Oct. 7, 2004

(65) Prior Publication Data
US 2006/0127269 A1    Jun. 15, 2006

(30) Foreign Application Priority Data
Mar. 26, 2003   (CA) ...................................... 2423273

(51) Int. Cl.
*C01B 31/34*    (2006.01)
(52) U.S. Cl. .......................................... 423/440; 75/240
(58) Field of Classification Search ................... 423/440; 75/240
See application file for complete search history.

(56) References Cited

U.S. PATENT DOCUMENTS

| 4,066,451 | A | * | 1/1978 | Rudy | 75/240 |
| 4,804,583 | A | * | 2/1989 | Moustakas | 428/469 |
| 5,746,803 | A | * | 5/1998 | Dunmead et al. | 75/351 |
| 6,551,569 | B1 | * | 4/2003 | Christian et al. | 423/440 |
| 2002/0112896 | A1 | | 8/2002 | Kruse et al. | |

FOREIGN PATENT DOCUMENTS

EP    0 759 480 A1    2/1997

OTHER PUBLICATIONS

Database WPI, Section Ch, Week 198002, Derwent Publications Ltd., London, GB; Class M22, AN 1974-21011v, XP002283040 & JP 54 041974b (Sumitomo Kenko Kogyo CO) Dec. 11, 1979.
"Hard Alloy for dot printer wires—consists of hard phase of tungsten and vanadium carbide(s) and binder phase of iron and nickel" Database WPI, May 13, 1985 XP002965688.
Andrews et al., "Diffusion of Carbon Thru Tungsten and Tungsten Carbide", J. Phys. Chem. 29 (4), pp. 462-472 (1925).
Bushmer et al., "Carbon Self-Diffusion in Tungsten Carbide", Journal of Materials Science, 6 (1971) 981-988.
Rafaja et al., "Combined Refinement of Diffusion Coefficients Applied on the Nb-C and Nb-N. Systems", Metallurgical and Materials Transactions A, vol. 29A, (1998), pp. 439-446.
Demetriou et al., "Kinetic modeling of phase selection during non-equilibrium solidification of a tungsten-carbon system", Acta Materialia 50 (2002) 1421-1432.

* cited by examiner

*Primary Examiner* — Stuart Hendrickson
(74) *Attorney, Agent, or Firm* — Fish & Richardson P.C.

(57) ABSTRACT

A method for the treatment of tungsten carbide is provided. The starting material contains tungsten carbide particles of a W—C system represented on a phase diagram showing a monophasic domain of a γ phase having a face-centered cubic structure, upwardly delimited by a liquidus line. The particles are subjected to a homogenization treatment in the monophasic domain, and may be subsequently melted to be spheroidized. They are then quenched to freeze at ambient temperature the monophased structure. Optionally, at least one alloying element may be added to the starting material to enlarge the monophasic domain, thereby increasing the hardenability of the monophased particles.

25 Claims, 10 Drawing Sheets

METHOD FOR TREATING TUNGSTEN CARBIDE PARTICLES

FIELD OF THE INVENTION

The present invention relates to the field of components for wear-resistant applications and more particularly concerns a method for obtaining tungsten carbide particles having improved mechanical characteristics.

BACKGROUND OF THE INVENTION

In the oil-drilling field, it is well known to apply a high carbide content wear-resistant coating by Laser and by Plasma Transfer Arc (PTA) to metallic tools. Such treatment allows a considerable increase in the service life of certain parts and to considerably reduce the cost of certain processes. The oil-drilling field is a typical example but other fields have shown an increasing interest in this type of wear-resistant coating, such as metal shaping and ore processing.

The use of lasers and PTA allows the application of welded coatings with a low dilution and porosity rate. These nearly perfect coating techniques however considerably increase the quality expectations for the deposition powders themselves. There is therefore an increasing demand for a product having a high hardness and good tenacity during use.

In the case of the carbide powders, it is also desirable to provide particles having rounded forms that limit the concentration of stresses in the coating, and allow the best flow possible during its application. A significant latent demand thus recently sprung up for spherical fused tungsten carbide powders with a diameter that suits laser and PTA applications.

Several types of tungsten carbide products are know in the field. Each of these product and their drawbacks are discussed herein below. For easy reference the phase diagram for the tungsten (W) and carbon (C) system (hereinafter referred to as the W—C system), by atomic percent of C is shown in FIG. 1 (PRIOR ART).

Angular Fused Tungsten Carbide

Commercially available fused (or cast) tungsten carbide is made by forming a liquid through the reaction of tungsten and carbon in a graphite crucible placed in an arc furnace. The resulting liquid of eutectic composition is then cast in water-cooled copper moulds. The solid obtained is then crushed to the desired mesh size. Fused tungsten carbide contains about 3.9% carbon by weight, and consists of about 80% $W_2C$ and 20% WC. The $W_2C$ phase has a hexagonal close-packed structure and is generally known to be harder but more fragile. The WC phase has a simple hexagonal structure and has 6.1% carbon by weight. The fine to coarse microstructure of the fused tungsten carbide typically consists of $W_2C$ crystals inserted as feathers in a lamellar structure, and Iron (Fe) is usually the largest impurity present. The microstructure of a fused tungsten carbide particle is shown in FIG. 2 (PRIOR ART).

The composition of the commercially available fused tungsten carbide is shown on the phase diagram of FIG. 1. It was developed at the beginning of the century and its carbon content must have been chosen to optimise its mechanical properties. It has a low hardness, approximately 2200 to 2400 Vickers (HV), resulting from the slow cooling rates obtained during solidification in the mould. This low hardness, combined with its coarse microstructure, make fused tungsten carbide a poor choice for wear resistant coating applications.

Pure Tungsten Carbide

Commercially available pure WC is produced in the solid state by carburizing tungsten oxide. The particles produced are of micron size and are mainly used for producing cemented carbides. For application as wear-resistant coatings, WC particles are mixed with fine cobalt (Co) powders, pressed to the desired shape and then sintered in the liquid phase. The amount of cobalt may be varied to optimize wear resistance and tenacity to meet the application needs.

Also known in the art is a new pure WC called "macro crystalline" from Kennametal, which is available in particle sizes close to those of fused tungsten carbide. It is used for the same applications as the latter and has improved properties. One of the reasons why these powders are preferred to fused tungsten carbide is that WC has a slower diffusion rate than $W_2C$, which mainly constitutes the latter. This property is important during welding if the heat is too great because there is then greater stripping of $W_2C$ than of WC in the matrix. The tungsten brought on by carbide stripping in the matrix weakens the latter and considerably hinders coating wear performance.

Pure WC, as the phase diagram of FIG. 1 shows, decomposes around 2785° C. to form a liquid phase with less carbon and solid carbon.

Spheroidal Fused Tungsten Carbide

Commercially available fused tungsten carbide particles as described above have several drawback for wear-resistant coating applications. Their numerous sharp angles can cause powder flow problems and a concentration of stresses in coatings. In addition, they present a rather unrefined microstructure and have a hardness of approximately 2400 HV. To improve the mechanical properties of fused tungsten carbide powders, it is known to spheroidize the particles.

One known method to obtain spheroidal tungsten carbide is to melt a mass or large particles of fused tungsten carbide, generally in a low temperature crucible but also possibly by plasma or by other heating processes and subsequently atomising the obtained liquid phase. The starting material must generally be of at least 1 mm in size to avoid operational difficulties in the use of a cold crucible. This technique gives a uniform microstructure but a wide particle size, typically from 10 µm to 3 mm. The powders produced are spherical or with rounded edges and have a very fine needle-shape structure that helps to increase particle hardness to values varying from 2600 to 3300 HV.

The above method however has its drawbacks. As previously mentioned, fused tungsten carbide at room temperature consists of $W_2C$ and WC as shown in the phase diagram of FIG. 1. Melting the product can bring the WC present to the liquid zone and produce free carbon (C). At the melting point of the carbide, the freed carbon sublimes. This entails the formation of porosity in the product that must be avoided since it may lead to the formation of cracks in the coatings. In addition, the atomisation process is also responsible for creating some porosity. Since this porosity does not depend on product decomposition during melting, it is more concentrated. It will give rise to some large pores instead of a group of small scattered pores.

The wide range of particle sizes obtained is also a drawback of the above technique to process powders appropriate for use in wear-resistant coating applications. The use of a cold crucible to spheroidize tungsten carbide particles is especially limitative when final particles of a small size, such as less than 200 µm are desired.

FIGS. 3 and 4 (both PRIOR ART) show spheroidized tungsten carbide particles obtained by Technogenia using the above described cold crucible technology. As can be seen, large pores are present and the particles have various sizes. The microstructure of the particles is however very constant and the average hardness is 3200 HV.

FIG. 5 (PRIOR ART) also shows spheroidized tungsten carbide particles, this time from Woka GmbH of Germany. Pores and irregularities in the particles may be seen. The microstructure of the particles is relatively uniform and does not show any cracks. The average hardness is 3040 HV.

Spheroidized particles are also obtained using atomisation by a rotary electrode. This process is however limited by the diameter and rotation speed of the electrode, and therefore allows the production of particles having a diameter of at least 200 μm.

Another known spheroidizing technique is by direct heating and eventually melting angular powders or aggregates by passing the particles through induced plasma, DC plasma, a radiating column, etc. Unlike the previous techniques, the particles are not atomized but take a spherical shape in the liquid state because of the surface strain of the material. Spheroidized particles having a diameter of less than 400-500 μm have been obtained using such a technique, and the hardness of the transformed tungsten carbide powders is increased to over 2900 HV. However, as with the cold crucible technique, the presence and partial decomposition of the WC present in the product entails free carbon liberation and pore formation. In addition, the differences in the thermal paths followed by different particles give rise to wide heterogeneity in the microstructure of the obtained particles.

Referring to FIGS. 6 and 7 (both PRIOR ART), spheroidized particles obtained by Transmateria are shown. They were made by passing angular particles of fused tungsten carbide through induced plasma at an extremely high temperature.

The phase transformation dynamics of the different phases of the heating and cooling process used to obtain these particles are better understood with reference to the phase diagram of FIG. 1. The starting material consists of angular fused tungsten carbide and therefore includes about 20% of WC and 80% of $W_2C$, which merge in two stages when they are heated in the plasma. The WC phase is transformed into a liquid phase of low carbon content and into solid carbon. The $W_2C$ goes directly to the liquid state without freeing any carbon. The carbon released by the WC phase is normally released from the particles but may also decompose into a vapour phase if the particles reach a critical temperature at which sublimation may occur. In that case, the carbon gas may cause porosity in the spheroidized particles because its volume is much greater than for the solid.

The carbon content of the liquid is then slightly lowered and moves the composition to the left on the phase diagram. This explains why the obtained spheroidized tungsten carbide has a carbon content of about 3.77% carbon by weight, while the initial angular tungsten carbide typically has about 3.95% carbon by weight. It should be noted that the carbon content is measured on the entire sample of particles and that a significant difference in carbon content between individual spheroidized particles may be expected, since they do not all undergo identical thermal exposure in the plasma. After their passage through the plasma the particles are then cooled very quickly, considering the small size of the particles. The resulting structure is therefore mainly constituted of a mixture of $W_2C$ and WC, similar to that of the original particle but finer in size.

Even though the residence time of the particles in the plasma is very short, it is still possible to spheroidize them. The main difficulty of this method is to control the thermal conditions for each of the particles treated, because the plasma has wide thermal variations. The particles, projected as a shower in the plasma, do not all undergo the same thermal path. A very wide variation in the microstructure of the spheroidized particles can therefore be observed such as evident in FIG. 6, although it is not typical to find so many different types of microstructures in such a limited zone. The particle identified with the letter A illustrates the most common microstructure in the obtained powder. This typical microstructure however may be more or less fine depending on the particles. Particle B illustrates a structure similar to that of particle A but it also has straight separations making angles of about 60° with one another. The other particles such as C and D illustrate a structure that is little affected by the Murakami solution and must thus have a structure that is fundamentally different from those of the other particles. Hardness measurements showed very wide variance in values, which may easily be linked with the various microstructures encountered.

The spheroidized tungsten carbide obtained by this method is characterized by high hardness but many cracks, as can be seen in FIG. 7. The presence of undesirable phases or phase structures seems to be the cause of this poor quality compared to the spheroidal tungsten carbide particles obtained by low temperature crucible. Cracks generally seem to occur more often in whiter particles than in those where we can easily see the attacked microstructure.

In view of the above, there is clearly a need for tungsten carbide powders that have high hardness and a fine homogeneous microstructure without any porosity. With its hardness of about 2400 HV, commercially available fused tungsten carbide is clearly inadequate. Particles spheroidized using a cold crucible have a good hardness but are porous and irregular, and are produce in too wide a range size. The DC plasma and induced plasma heating systems available provide paths and heterogeneous thermal pressure gradients that favour decomposition of the WC, also promoting the formation of pores.

It should be noted that there is market eagerness for products that meet specific needs. A well documented case is the demand for spherical niobium carbide powders that allow to apply anti-seizing coatings in the steel forming field (see for example Patrick Klaer, Franz Kiefer, Klas Stjernberg, James J. Cakes, "Optimization of the microstructure of cemented carbide grades for hot rolling applications" P/M Science & Technology Briefs, Vol. 1, No. 4, 1999, pp. 5-9; and K. Tsubouchi, M. Akiyama, M. Tsumura et S. Amano, "Development of a wear-resistant surface layer for a tool to be used for high-temperature stainless steel rolling", Proc. Instn. Mech. Engrs., Vo/213 Part J, 1999, page 473-480). The use of such powders is limited by the low diffusion rate of carbon in niobium and niobium carbide. This low diffusion rate combined with the high cost of maintaining the fill charge at high temperature results in the production of very fine powder that cannot be used for PTA and Laser applications. Although it is possible to agglomerate this dust and to sinter it, this again increases production costs. The high cost of niobium is another factor limiting its use. Other carbides such as titanium, vanadium and niobium based carbides could be of some interest to the market but their high melting points, the accessible phases and the production costs are prohibitive to their use.

OBJECTS AND SUMMARY OF THE INVENTION

It is therefore an object of the present invention to provide tungsten carbide particles having improved characteristics.

It is a preferable object of the invention to provide tungsten carbide particles having a high hardness, a fine homogeneous microstructure and relatively free of pores.

It is another preferable object of the invention to provide angular tungsten carbide having the above listed characteristics.

It is yet another object of the invention to provide spherical tungsten carbide having the above listed characteristics.

Accordingly, the present invention provides a method for treating tungsten carbide particles, including the following steps of:

a) providing a starting material containing tungsten carbide particles of a W—C system whose compositions, microstructures and phase distribution are represented on a phase diagram showing a monophasic domain of a Y phase having a face-centered cubic structure. This monophasic domain is upwardly delimited by a liquidus line. The particles have a content in carbon chosen so that they have a thermal path that crosses the monophasic domain;

b) subjecting the starting material to a homogenization treatment in the monophasic domain. Particles having a face-centered cubic structure are thereby obtained; and c) quenching the tungsten carbide to freeze at ambient temperature the monophased particles.

In accordance with a further aspect, the present invention also provides a method for treating tungsten carbide particles, comprising the steps of:

a) providing a starting material containing cast eutectic tungsten carbide particles of a given hardness having a particle size ranging from 1 μm and 5 mm and comprising WC and $W_2C$, the tungsten carbide particles being of a W—C system whose compositions, microstructures and phase distribution are represented on an equilibrium temperature-composition binary phase diagram plotting temperature against relative concentrations of W and C, the binary phase diagram of the W—C system showing a monophasic domain of a γ solid phase corresponding to $WC_{1-x}$ having a face-centered cubic structure;

b) subjecting the starting material to a homogenization heat treatment in the monophasic domain, thereby obtaining $WC_{1-x}$ monophased particles having a face-centered cubic structure;

and c) subsequently to the homogenization treatment of step b), subjecting the tungsten carbide particles to a quenching step to freeze at ambient temperature at least a portion of the face-centered cubic structure and refine grain size of the microstructure, thereby obtaining a final product at ambient temperature containing particles with a finer miscrostructure than the starting material, a particle size similar to the particle size of the starting material, a composition comprising at least a portion of face-centered cubic $WC_{1-x}$ structure and a hardness greater than the hardness of the starting material.

According to a still further aspect, the present invention provides a method for treating tungsten carbide particles, comprising the steps of:

a) providing a starting material containing cast eutectic tungsten carbide particles having a particle size ranging from 1 μm and 5 mm and comprising WC and $W_2C$;

b) subjecting the starting material to a homogenization heat treatment at a temperature between 2535° C. and 2720° C. and obtaining $WC_{1-x}$ monophased solid particles having a face-centered cubic structure;

and c) subsequently to the homogenization of step b), subjecting the tungsten carbide particles to a quenching treatment to freeze at ambient temperature at least a portion of the of the face-centered cubic structure and to refine the microstructure, thereby obtaining a final product at ambient temperature containing particles having a finer microstructure than the starting material, a particle size similar to the particle size of the starting material, and a composition comprising at least a portion of cubic face-centered $WC_{1-x}$.

In accordance with a preferred embodiment of the invention, an additional step heating the monophased particles above the liquidus line to spheroidize the particles is performed between the homogenization treatment and the quenching.

According to another aspect of the invention, there are provided monophased tungsten carbide particles treated according to the method of the present invention, these particles having a face-centered cubic microstructure.

The present invention will be better understood upon reading of preferred embodiments thereof with reference to the appended drawings.

DESCRIPTION OF PREFERRED EMBODIMENTS OF THE INVENTION

Figure 1:
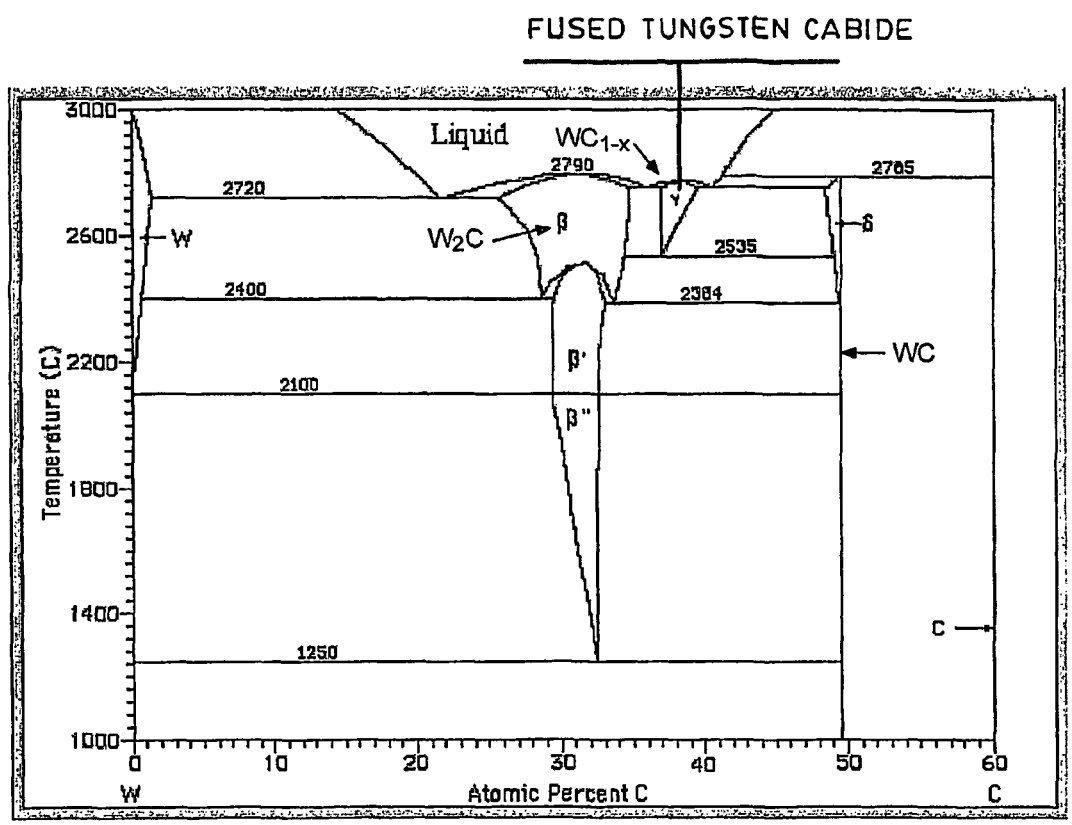
FIG. 1 (PRIOR ART) is the phase diagram of tungsten and carbon by atomic percent of C.
Figure 2:
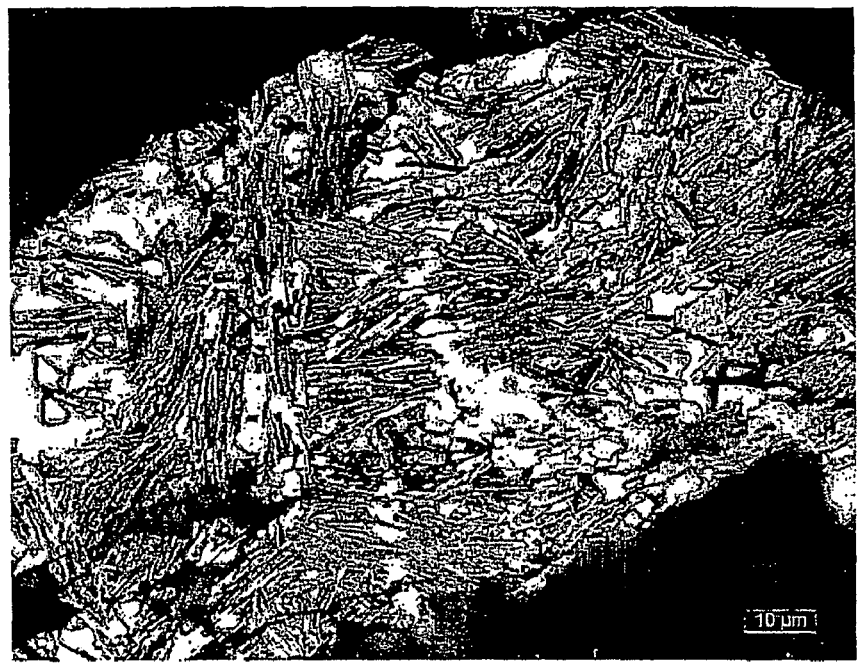
FIG. 2 (PRIOR ART) shows the microstructure of commercially available fused tungsten carbide particles (Marakami, 1000×).
Figure 3:
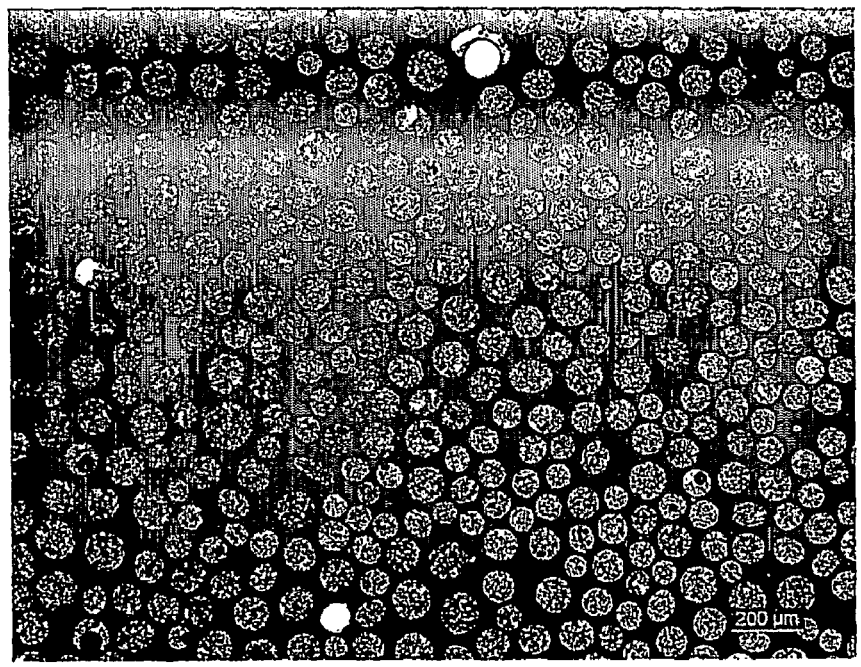
FIG. 3 (PRIOR ART) and FIG. 4 (PRIOR ART) show the microstructure of tungsten carbide particles from Technogenia spheroidized by cold crucible, respectively enlarged 50× and 500×.
Figure 4:
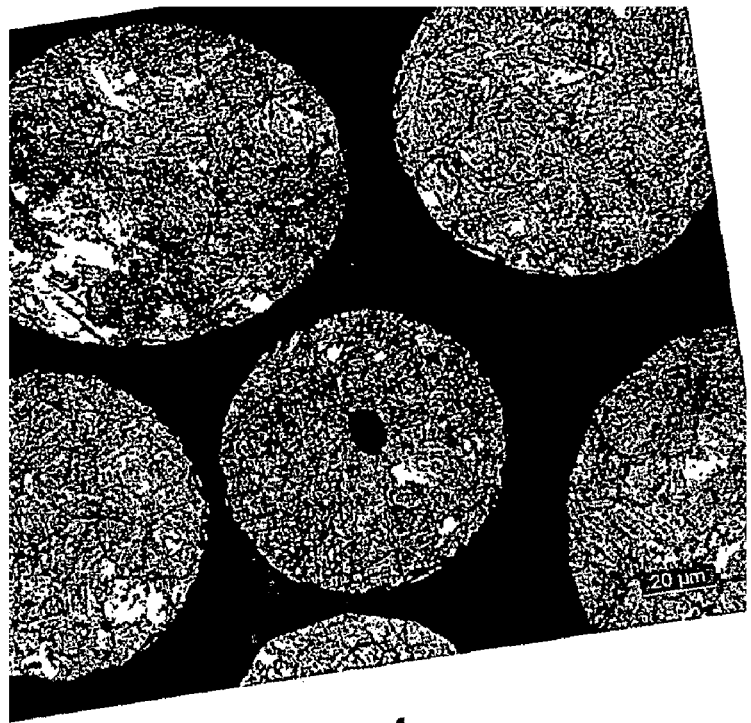
Figure 5:
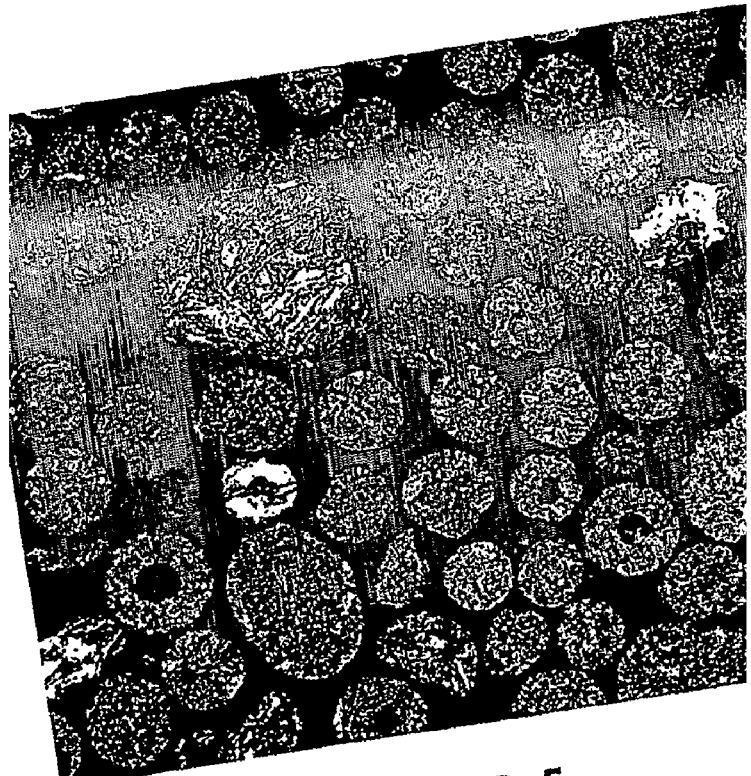
FIG. 5 (PRIOR ART) shows the microstructure of tungsten carbide particles from Woka GmbH spheroidized by cold crucible, enlarged 200×.
Figure 6:
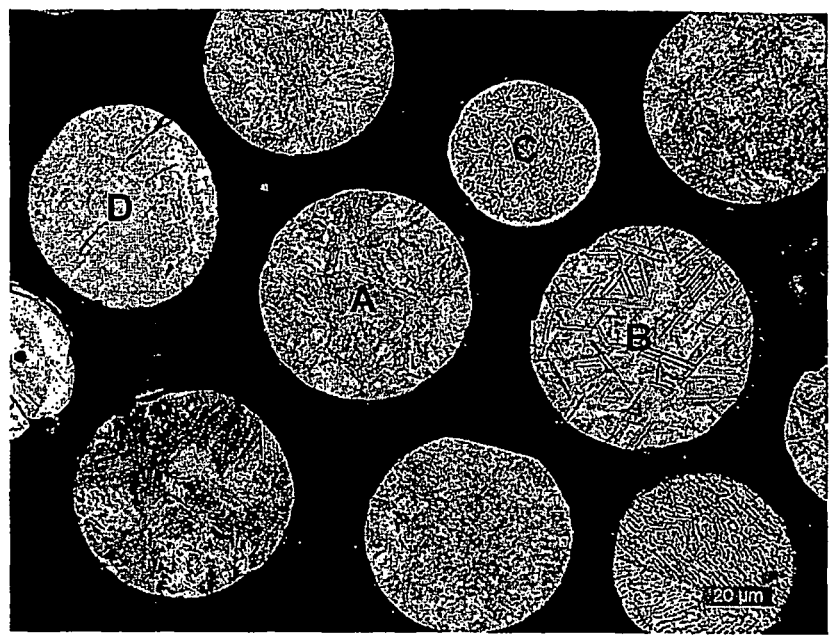
FIG. 6 (PRIOR ART) shows the microstructure of tungsten carbide particles from Transmateria spheroidized by induced plasma, enlarged 500×.
Figure 7:
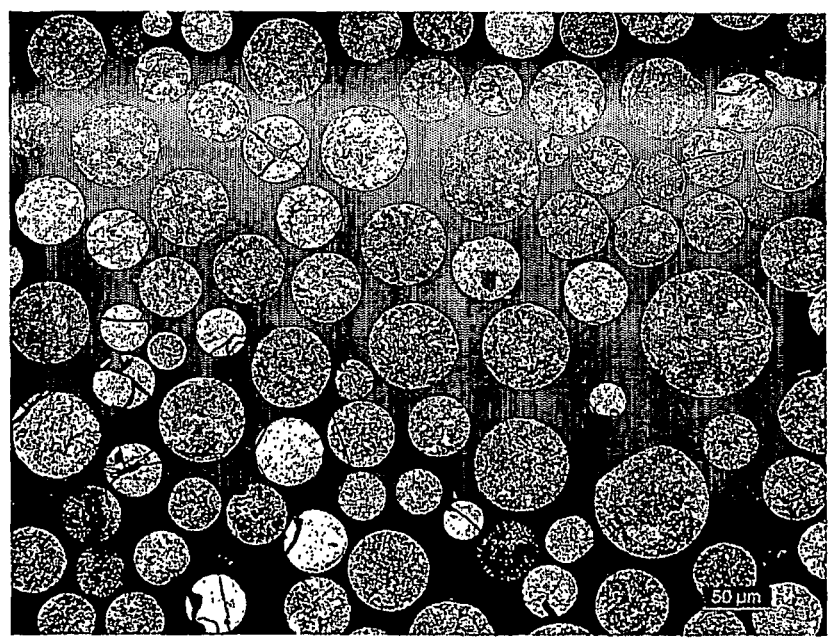
FIG. 7 (PRIOR ART) shows the microstructure of tungsten carbide particles from Transmateria spheroidized by induced plasma, enlarged 200×.

Referring to the phase diagram of FIG. 1, it can be seen that it shows a monophasic domain γ for a carbon content of about 37% to 39%. This monophasic domain will be hereinafter designated as the homogenization zone. In the particular case of the W—C system, the phase γ corresponds to a $WC_{1-x}$ composition, is metastable and has a face-centred cubic structure. It is not generally found in conventional fused tungsten carbide as the cooling rate after casting the material is not sufficiently high to freeze this metastable structure, which has a relatively restricted equilibrium zone.

According to a preferred embodiment of the invention, there is provided a method for treating tungsten carbide particles to obtain monophased cubic face-centered particles at ambient termperature. This method generally includes the following steps:

a) providing a starting material containing tungsten carbide particles of a W—C system whose compositions, microstructures and phase distribution are represented on a phase diagram showing a monophasic domain of a γ phase having a face-centered cubic structure. This monophasic domain is upwardly delimited by a liquidus line, and the particles having a content in carbon chosen so that they have a thermal path that crosses the monophasic domain. In the preferred embodiment of the invention, the starting material is commercially available fused tungsten carbide, therefore includes angular shaped particles having a eutectic composition of $W_2C$ and WC.

b) subjecting the starting material to a homogenization treatment in the monophasic domain. Monophased particles are thereby obtained.

c) quenching the tungsten carbide) to freeze at ambient temperature the monophased particles.

The presence of the $WC_{1-x}$ phase after quenching, with its face-centred cubic structure, has the advantage of enhancing the mechanical properties of the powders produced. Commercially available fused tungsten carbide mainly consists of $W_2C$ with a hexagonal close-packed structure, which is generally recognized as being the hardest but also as more fragile than the hexagonal simple structure of the WC phase, which is generally described as having weak tenacity.

Submitting fused tungsten carbide to a homogenization treatment as explained above without crossing the liquidus line will not spheroidize the particles, but rearrange the microstructure of the angular tungsten carbide so that its hardness is increased, typically above 2900 HV. Alternatively, it is possible to add a step between steps b) and c) of heating the tungsten carbide above the liquidus line. The particles will thereby be spheroidized.

The $WC_{1-x}$ phase has the characteristic that it does not decompose during melting. This is of great interest since the absence of decomposition prevents the formation of pores and promotes greater homogeneity of the final powder microstructure. Furthermore, the homogenization of the phase allows the resulting particles to follow typical thermal paths provided by DC and induced plasma torches upon melting, thereby increasing the final homogeneity of the product. In addition, the absence of decomposition eliminates the effect that causes particle overheating during their melting.

The method above is suitable to obtain tungsten carbide particles of a small size, such as 200 μm or less, as often required for wear resistant coating applications. As the present process transforms the starting material without requiring atomisation of a large mass, the particles of the final product are the same average size as in the starting material, with a different shape and microstructure. A final particle size of anywhere between 1 μm and 5 mm may therefore be obtained using starting material of approximately the same particle size, taking into account only the differences due to evaporation and the shape factor.

Figure 8:
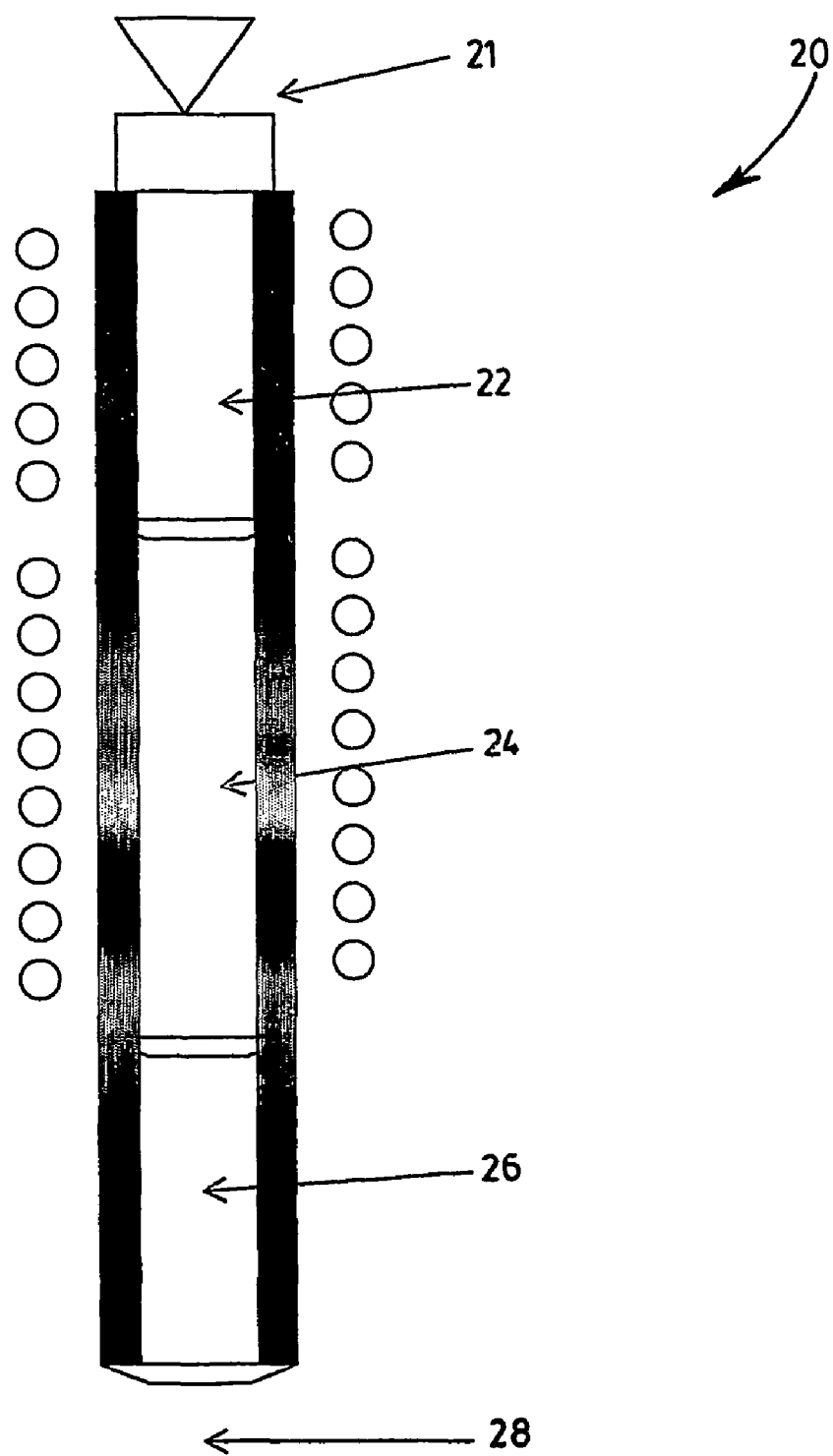
FIG. 8 is a schematic side view of a graphite furnace for performing the method according to a preferred embodiment of the invention.
Figure 9:
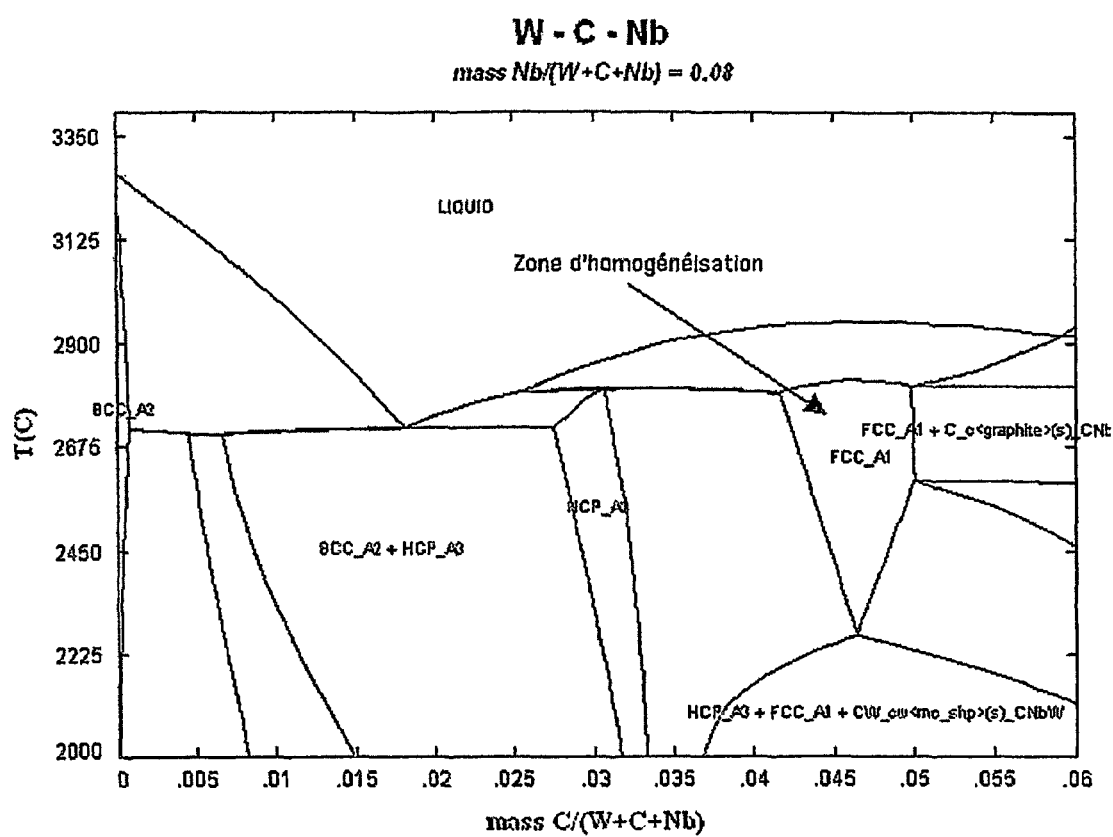
FIG. 9 (PRIOR ART) is the phase diagram of a W—C—Nb system having 8% Nb by weight, by C weight.
Figure 10:
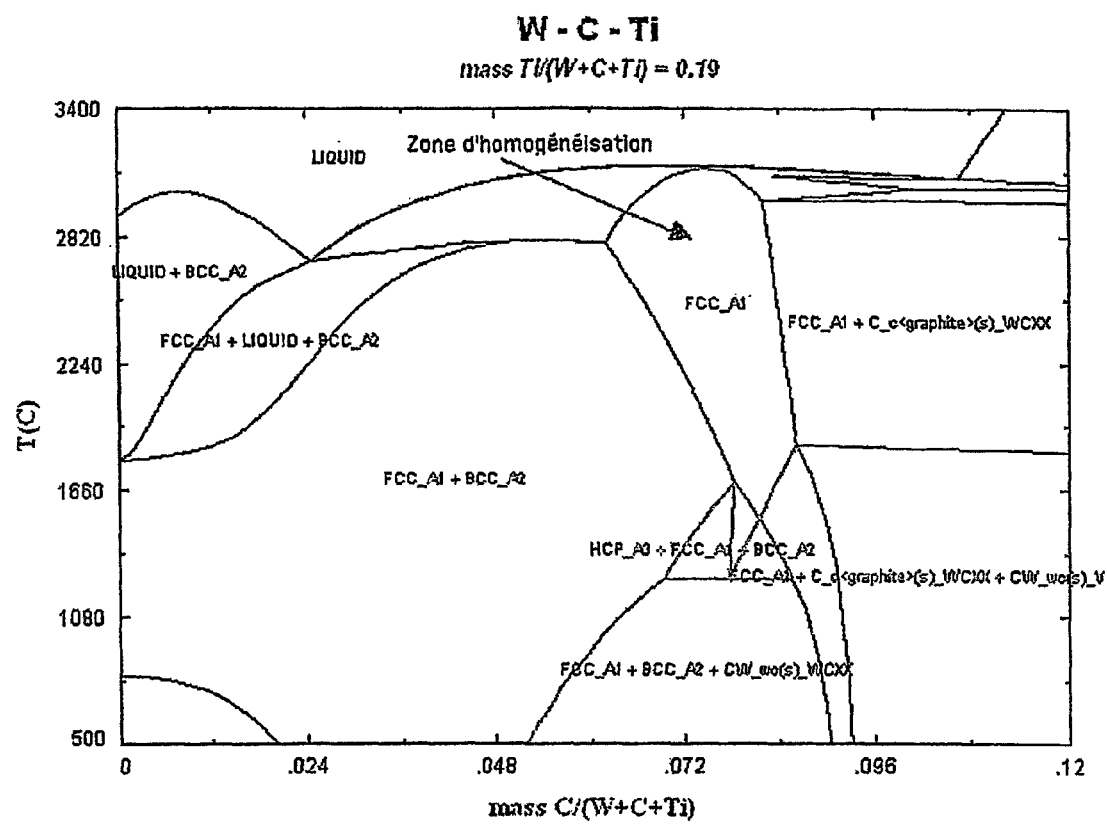
FIG. 10 (PRIOR ART) is the phase diagram of a W—C—Ti system having 19% Ti by weight, by C weight.
Figure 11:
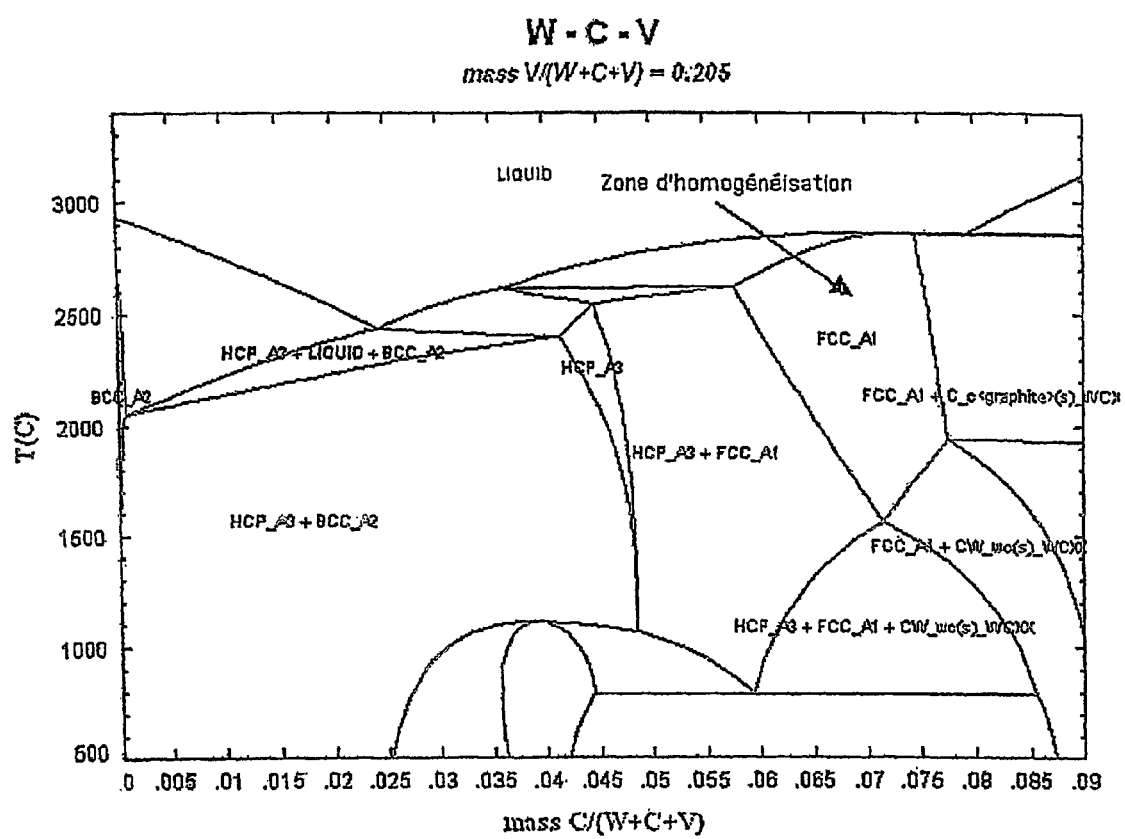
FIG. 11 (PRIOR ART) is the phase diagram of a W—C—Va system having 20.5% Va by weight, by C weight.
Figure 12:
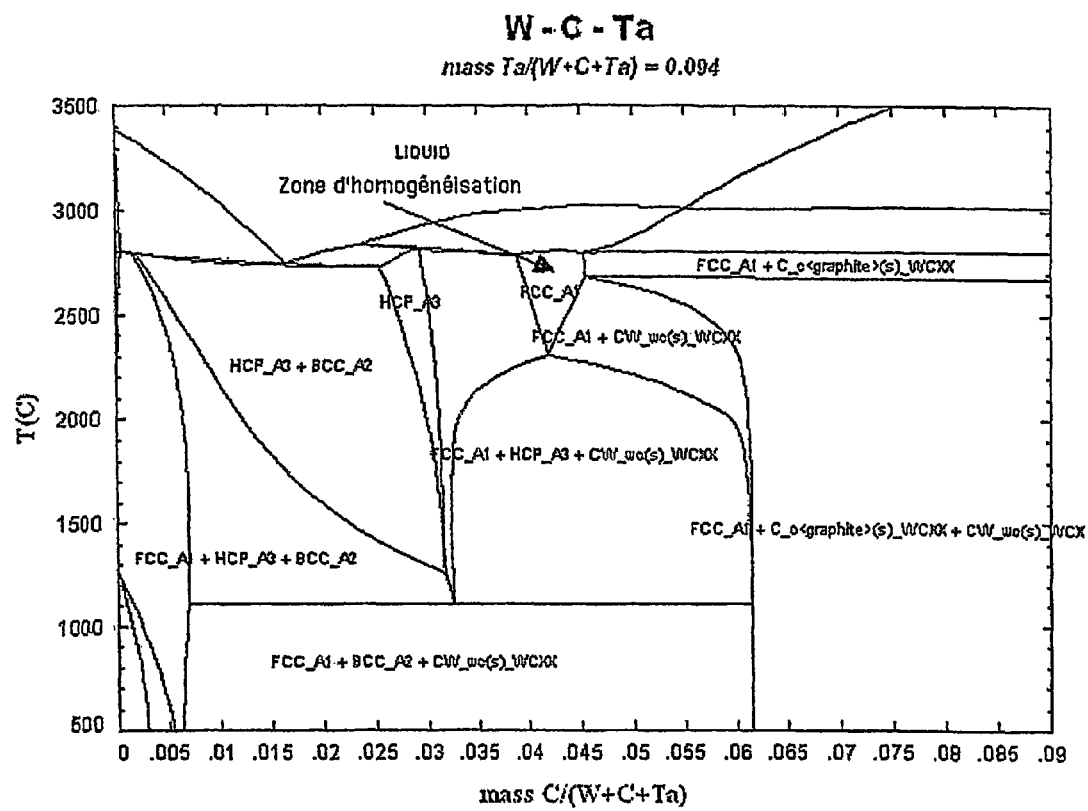
FIG. 12 (PRIOR ART) is the phase diagram of a W—C—Ta system having 9.4% Ta by weight, by C weight.

The homogenisation treatment and spheroidization of tungsten carbide particles according to the present invention may be realized by any appropriate heating process including a furnace, a heating tower, a plasma system, a laser system or any system or combination of systems allowing the to reach the desired effect. Referring to FIG. 8, there is shown a graphite furnace 20 which is suitable to perform the method according to a preferred embodiment of the invention. The use of a graphite furnace for the present process is advantageous to heat the starting material at a temperature sufficient to homogenize the tungsten carbide particles without crossing the liquidus line. In the illustrated embodiment, the furnace 20 has a feeding system 21 from which the starting material is inserted in the furnace 20. The particles then cross a top chamber 22 and a bottom chamber 24 which are connected together so as to allow particle circulation from the top (22) to the bottom chamber (24). By selecting appropriate temperatures for each chambers, the top chamber 22 is used to perform the homogenization treatment while the bottom chamber spheroidize the resulting particles by heating the same above the liquidus line. In the case of a W—C system as illustrated in FIG. 1, the top chamber is for example heated at a temperature between 2600 and 2700° C., and the bottom chamber is heated above 2750° C. Furnaces including two chambers are already known in the field for other applications, and could be used to perform the present process. It may also be of interest to heat the bottom chamber with induced plasma, to better reach the high temperatures necessary for melting the tungsten carbide. Care should be taken in such a case to avoid reaching such temperatures as to actually consume the oven in the process. The furnace 20 finally includes a quenching area 26 and a collecting area 28.

It should be understood however that the scope of the present invention is not limited to the use of a graphite furnace. Any device allowing heating fused tungsten carbide at the requisite temperatures and quenching the transformed particles directly, that is without atomisation, may be used to perform the steps of the present method.

Figure 13:
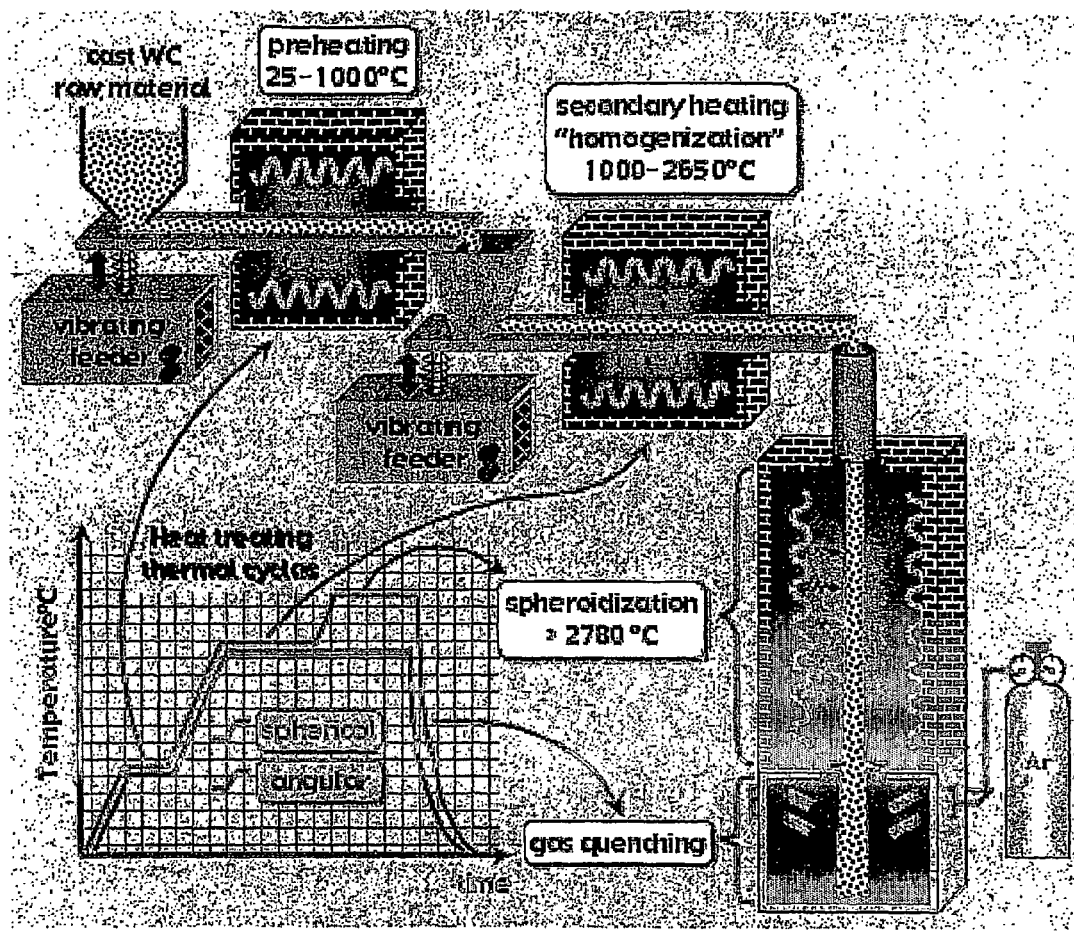
FIG. 13 is a diagram illustrating the steps of a method to treat tungsten carbide particles according to a preferred embodiment of the invention.

Referring to FIG. 13, another embodiment of the present invention is schematically illustrated. In this case, the starting material is provided in a feeding system 32, and is brough to a first oven 34, where it undergoes a pre-heating step at a temperature selected to perform the homogenisation treatment in accordance with the principles of the present invention. The resulting monophased particles are then optionally brough to a second oven 36 where they are heated above the liquidus line of the corresponding phase diagram, and are therefore spheroidized. If this step is omitted, then angular monophased particles will be obtained. The particles are finally fed into a quenching enclosure 38 where they undergo gas quenching, preferably using Argon gas, to freeze the obtained face-centered cubic microstructure. In the illustrated embodiment, vibrating feederd 40 are used to move the particles from one station the the next.

In accordance with another preferred embodiment of the invention, the starting material may contain at least one alloying elements. The proportion by weight of the alloying element may be as low as 0.1%. Preferred choices of alloying elements are titanium, niobium, vanadium and tantalum. Their use in the starting element has the general effect of facilitating the homogenisation treatment by enlarging the monophasic domain of the $WC_{1-x}$ phase of the W—C system, and increasing the stability of the face-centered cubic structure after quenching. FIGS. 9 to 12 show the phase diagram for the W—C system resulting from the addition of each of these alloying elements. For each element a given proportion is selected by way of example, but it should be understood that a wide range of compositions are possible without departing from the scope of the invention. It is considered that the proportions of fused tungsten carbide may be anywhere between 1 to 100%, and of each of niobium carbide, vanadium carbide, tantalum carbide and titanium carbide between 1 to 99%. Combinations of alloying elements are also possible.

Proper selection and use of alloying elements provides several advantages. It may increase the temperature and the carbon composition of the stability range for the resulting (W,X)C$_{1-x}$ monophasic domain. This can be observed in FIGS. 9 to 12. It may also increase the hardenability of the face-centered cubic structure, that is, its ability to be hardened by quenching, as measured by the depth and distribution of hardness induced by the quenching. The hardenability of a metal shows up in a comparison of T-T-T curves. Greater hardenability is indicated when the TTT plot is displaced to the right with respect to the time axis. This in turn leads to the obtaining of a higher percentage of face-centred cubic structure after quenching, which improves the mechanical properties of the final product such as its hardness and tenacity. It also refines the final microstructure of the powders and promotes a greater homogeneity of the final microstructure.

Of particular interest is the case where Niobium (Nb) is used as an alloying element. The addition of niobium in the mixed carbides reduces their miscibility during welding because the diffusion rate in the niobium and niobium carbide is known to be particularly slow. The resulting product is much less subject to stripping in the matrix during welding, thereby limiting the subsequent formation of brittle phases in the matrix. Its properties are in this respect similar to the recognized advantages of Kennametal pure WC "macrocrystalline" powders. Vanadium has properties that are similar to those of niobium and the advantages of addition to mixed carbide with the tungsten are similar. It should be noted that niobium and vanadium carbide are already used as a grain boundary stabilizer for high performance and superalloy steel because of their low miscibility at high temperature in nickel, iron, chromium and cobalt alloys. For the specific case of niobium, it may also be noted that its beneficial effect in tungsten carbide may also be a beneficial effect of tungsten on niobium carbide. As previously mentioned, the production of niobium powders with excellent anti-seizing properties, with a particle size that is favourable to PTA and Laser deposition, is limited by the problem of carbon diffusion in the latter and its carbide. The addition of tungsten or tungsten carbide to niobium or niobium carbide, in effect corresponding to the case where the proportion of NbC in the mix is more than 50%, thereby facilitates the production of mixed carbide powders with a fine structure that have undergone homogenisation in the course of production and that have a good particle size distribution (10-200 µm) for PTA and Laser applications. This is because the contribution of W$_2$C will act favourably on the diffusion of carbon in the mixed carbide.

Tests were made with the introduction of 8% NB cast with tungsten carbide, which was found to be a particularly advantageous proportion. The introduction of the niobium lowered by more than 64% de diffusion coefficient of carbon at the temperature where the periectoid transformation to the monophase (W,Nb)C1-x begins. The temperature where the periectoid transformation begins was brough down to 2260° C., a lowering of more than 270° C. of this particular point as compared to the case of straight fused tungsten carbide. In addition, the presence of niobium carbide slows down considerably carbon diffusion in carbide since the bonding energy of carbon with niobium is three times higher than the bonding energy of carbon and tungsten. Again, this lowering of the diffusion coefficient allows to quench the (W,Nb)C1-x phase and therefore increase the tenacity of the carbide.

Titanium has exceptional hardness and the diffusion rates authorized in the latter and its carbide are also very low. It is therefore advantageous to incorporate titanium to the tungsten carbide particules as an alloying element. Titanium carbide increases hardness, hardenability and carbon composition stability in the (W,Ti)C$_{1-x}$ phase of the mixed carbide. Adding fused tungsten carbide to titanium carbide also increases the rate of diffusion in the latter and facilitates the production of mixed powders with a high content in titanium carbide and of the size suitable for PTA and Laser applications.

In accordance with another aspect of the present invention, there are provided tungsten carbide particles treated according to the principles of the present invention, and thereby having a microstructure constituted of monophased WC$_{1-x}$. One skilled in the art will understand this does not necessarily entails that each particle has a strictly face-centered cubic structure, but that the particles have been substantially rearranged so as to obtain the benefits of such a structure. The resulting particles may be spherical or angular powders, depending on the embodiment.

The tungsten carbide powders obtained from the present invention, mixed or otherwise, are particularly adapted to a number of applications such as anti-seizing coatings, independently of the deposition method used. Laser and PTA deposition are examples of possible deposition methods. The resulting anti-seizing coatings may be used for example but not exclusively for hot or cold shaping rollers, in the plastic or metal molding field, in the mechanical field (shafts, journals, screws, gears, bearings, etc.), in the oil field (mobile component of the drilling string, etc.) and in the transportation field (brake disks, etc.) Mixed carbides are especially appropriate in welding for the specific purpose of obtaining a coating with low carbide stripping in iron, cobalt, nickel and chromium. This includes their use as addition or projection powders, wire or flexible cords or welding rod or brazing components.

Of course, numerous modifications could be made to the embodiments above without departing from the scope of the present invention as defined in the appended claims.

The invention claimed is:

1. A method for treating tungsten carbide particles, comprising the steps of:
  a) providing a starting material containing cast eutectic tungsten carbide particles having a particle size between 1 µm and 5 mm and comprising WC and W$_2$C, said tungsten carbide particles being of a W—C system whose compositions, microstructures and phase distribution are represented on an equilibrium temperature-composition binary phase diagram plotting temperature against relative concentrations of W and C, said binary phase diagram of the W—C system showing a monophase domain of a γ solid phase corresponding to WC1-x having a face-centered cubic structure;
  b) subjecting said starting material to a homogenization heat treatment in said monophasic domain, thereby obtaining WC$_{1-x}$ monophased particles having a face-centered cubic structure;
  and
  c) subsequently to the homogenization treatment of step b), subjecting the tungsten carbide particles to a quenching step to freeze at ambient temperature at least a portion of the face-centered cubic structure and refine grain size of the microstructure, thereby obtaining a final product at ambient temperature containing particles with a finer miscrostructure than the starting material, a particle size about the same size as the particle size of the starting material, a composition comprising at least a portion of face-centered cubic WC$_{1-x}$ structure.

2. A method according to claim 1, comprising between the homogenization heat treatment and the quenching, the step of:
  heating the WC$_{1-x}$ monophased particles above a liquidus line of the monophasic domain to spheroidize the particles.

3. A method according to claim 1 or 2, wherein said tungsten carbide particles of the starting material have an angular shape.

4. A method according to claim 3, wherein said tungsten carbide particles of the starting material have an average diameter of less than 200 μm.

5. A method according to claim 1, wherein said tungsten carbide particles of the starting material contains between 37% and 39% of atomic C.

6. A method according to claim 1, wherein the hardness of the final product is at least 2900 HV.

7. The method according to claim 1, wherein said starting material contains at least one alloying element for enlarging said monophasic domain, thereby increasing the hardenability of the monophased particles.

8. The method according to claim 7, wherein said alloying element is selected from the group consisting of Ti, V, Nb and Ta.

9. The method according to claim 7, wherein said starting material further contains at least 0.1% by weight of Nb.

10. The method according to claim 9, wherein said starting material further contains 8% by weight of Nb.

11. The method according to claim 7, wherein said alloying element is cast with the tungsten carbide in said starting material.

12. A method according to claim 1, wherein said tungsten carbide particles of the starting material contains between 37% and 39% of atomic C.

13. The method according to claim 8, wherein said final product further contains particles of a $XC_{1-x}$ composition, wherein X is selected from the group consisting of Ti, V, Nb and Ta.

14. The method according to claim 1, wherein the homogenization treatment of step b) comprises heating the starting material in a graphite furnace.

15. The method according to claim 2, comprising the use of a graphite furnace having top and bottom chambers connected so as to allow particle circulation from the top to the bottom chamber, said homogenization treatment taking place in the top chamber, and said heating above the liquidus line taking place in the bottom chamber.

16. The method according to claim 15, wherein said bottom chamber is heated by induced plasma.

17. Tungsten carbide particles obtained according to the method of claim 1, said particles comprising at least a portion of face-centered cubic $WC_{1-x}$, a particle size ranging from 1 μm and 5 mm.

18. Tungsten carbide particles obtained according to the method of claim 8, said particles having a face-centered cubic microstructure, a first portion of said particles having a $WC_{1-x}$ composition, and a second portion of said particles having a $XC_{1-x}$ composition, wherein X is selected from the group consisting of Ti, V, Nb and Ta, said particles having a particle size between about 1 μm and 5 mm.

19. Monophased tungsten carbide particles according to claim 18, wherein X consist of Nb and the second portion of the particles constitute more than 0.1% of said monophased tungsten carbide particles, thereby reducing the miscibility thereof at high temperature.

20. A method for treating tungsten carbide particles, comprising the steps of:
    a) providing a starting material containing cast eutectic tungsten carbide particles having a particle size ranging from 1 μm and 5 mm and comprising WC and $W_2C$;
    b) subjecting said starting material to a homogenization heat treatment at a temperature between 2535° C. and 2720° C. and obtaining WC1-x monophased solid particles having a face-centered cubic structure; and
    c) subsequently to the homogenization of step b), subjecting the tungsten carbide particles to a quenching treatment to freeze at ambient temperature at least a portion of the of the face-centered cubic structure and to refine the microstructure, thereby obtaining a final product at ambient temperature containing particles having a finer microstructure than the starting material, a particle size similar to the particle size of the starting material, a composition comprising at least a portion of cubic face-centered $WC_{1-x}$.

21. A method according to claim 20, comprising between the homogenization heat treatment of step b) and the quenching treatment of step c), the step of:
    heating the particles obtained in step c) at a temperature above 2720° C. to spheroidize the particles.

22. Tungsten carbide particles obtained according to the method of claim 20, said particles comprising at least a portion of face-centered cubic $WC_{1-x}$ and a particle size ranging from 1 μm and 5 mm.

23. A method according to claim 20 or 21, wherein said tungsten carbide particles of the starting material have an angular shape.

24. Tungsten carbide particles obtained according to the method of claim 21, said particles comprising at least a portion of face-centered cubic $WC_{1-x}$ and a particle size ranging from 1 μm and 5 mm.

25. A method according to claim 22, wherein said tungsten carbide particles of the starting material have an average diameter of less than 200 μm.

* * * * *